(12) United States Patent
Lin et al.

(10) Patent No.: US 8,135,561 B2
(45) Date of Patent: *Mar. 13, 2012

(54) SENSING SYSTEM

(75) Inventors: Cho-Yi Lin, Hsinchu (TW); Hsin-Chi Cheng, Hsinchu (TW)

(73) Assignee: Pixart Imaging inc., Hsinchu (TW)

( * ) Notice: Subject to any disclaimer, the term of this patent is extended or adjusted under 35 U.S.C. 154(b) by 210 days.

This patent is subject to a terminal disclaimer.

(21) Appl. No.: 12/632,808

(22) Filed: Dec. 8, 2009

(65) Prior Publication Data

US 2010/0090987 A1    Apr. 15, 2010

Related U.S. Application Data

(63) Continuation-in-part of application No. 12/249,222, filed on Oct. 10, 2008, now Pat. No. 7,689,381.

(30) Foreign Application Priority Data

Oct. 28, 2009   (TW) .............................. 98136583 A

(51) Int. Cl.
G06F 15/00 (2006.01)
G06F 3/033 (2006.01)
G06F 3/042 (2006.01)
(52) U.S. Cl. ..................... 702/150; 345/157; 178/18.09
(58) Field of Classification Search .................. 702/150, 702/151, 152, 153; 345/173, 157, 158; 178/18.09
See application file for complete search history.

(56) References Cited

U.S. PATENT DOCUMENTS

| | | | |
|---|---|---|---|
| 4,507,557 A | 3/1985 | Tsikos | |
| 4,782,328 A | 11/1988 | Denlinger | |
| 6,036,189 A | 3/2000 | Gomez et al. | |
| 6,803,906 B1 | 10/2004 | Morrison et al. | |
| 7,109,978 B2 | 9/2006 | Gillespie et al. | |
| 7,692,625 B2 | 4/2010 | Morrison et al. | |
| 7,755,026 B2 | 7/2010 | Pittel et al. | |
| 7,907,124 B2 | 3/2011 | Hillis et al. | |
| 7,924,272 B2 | 4/2011 | Boer et al. | |
| 2005/0243070 A1* | 11/2005 | Ung et al. ..................... 345/176 |
| 2009/0090569 A1 | 4/2009 | Lin | |

FOREIGN PATENT DOCUMENTS

| | | |
|---|---|---|
| JP | 1984211128 A | 11/1984 |
| JP | 20051025415 A | 1/2005 |
| WO | 2005034027 A1 | 4/2005 |

* cited by examiner

Primary Examiner — Bryan Bui
(74) Attorney, Agent, or Firm — Chun-Ming Shih

(57) ABSTRACT

A sensing system includes a panel, a reflective element, an image sensor, a processor, a first light guide rod, a second light guide rod and a light source module. The panel has a plane and a first area and a third area located at the plane. The third area in the first area is smaller than or equal to the first area. The first area has four boundaries connected in order. A reflective mirror plane of the reflective element disposed at the first boundary mirrors the first and third areas. The image sensor disposed at the intersection of the third and fourth boundaries is electrically connected to the processor. The first and the second light guide rods are disposed at the second and the third boundaries respectively. The light source module is adapted to emit light passing through the first and the second light guide rods to the image sensor.

11 Claims, 7 Drawing Sheets

SENSING SYSTEM

CROSS-REFERENCES

This application is the continuation-in-part (CIP) of U.S. application Ser. No. 12/249,222 filed on Oct. 10, 2008 now U.S. Pat. No. 7,689,381 and claims priority to Taiwan application No. 098136583 filed on Oct. 28, 2009. U.S. application Ser. No. 12/422,191 FILED ON Apr. 10, 2009 which claims priority to Taiwan application No. 098100969, U.S. application Ser. No. 12/334,449 FILED ON Dec. 13, 2008 which claims priority to Taiwan application No. 097142355, U.S. application Ser. No. 12/249,222 FILED ON Oct. 10, 2008 which claims priority to Taiwan application No. 097126033, and U.S. application Ser. No. 12/550,681 FILED ON Aug. 31, 2009 which claims priority to Taiwan application No. 098104392 are co-pending with this application.

BACKGROUND

1. Field of the Invention

The present invention relates to a sensing system, and more particularly, to a sensing system having a reflective element.

2. Description of the Related Art

Touch systems have been disclosed in many patents, such as U.S. Pat. Nos. 4,782,328 and 6,803,906. Each of the touch systems disclosed in the above two patents must have at least two sensors such that the production cost of each of the touch systems disclosed in the patents is relatively high. One of the two patents is described thereinafter in detail.

FIG. 1 is a schematic view of a conventional touch screen system. Referring to FIG. 1, the touch screen system 100 disclosed in the U.S. Pat. No. 4,782,328 includes a panel 110, a first photosensor 120, a second photosensor 130 and a processor 140. The panel 110 has a touch screen area 112 which is a rectangle. The first photosensor 120 and the second photosensor 130 are disposed at two opposite ends of a boundary 112a of the touch screen area 112. The sensing range of the first photosensor 120 and that of the second photosensor 130 cover the whole touch screen area 112 respectively. Furthermore, the first photosensor 120 and the second photosensor 130 are electrically connected to the processor 140.

When a pointer 150 touches the touch screen area 112, the first photosensor 120 senses the pointer 150 along a first sensing path 162 and the second photosensor 130 senses the pointer 150 along a second sensing path 164. The processor 140 calculates the location of the pointer 150 according to the first sensing path 162 and the second sensing path 164.

However, the conventional touch screen system 100 must have the two photosensors 120 and 130 such that the production cost thereof is relatively high.

BRIEF SUMMARY

The present invention is directed to provide a sensing system of which the production cost is relatively low.

The present invention provides a sensing system adapted to sense a pointer and calculate a location of the pointer. The sensing system includes a panel, a reflective element, an image sensor, a processor, a first light guide rod, a second light guide rod and a light source module. The panel has a first plane, a first area located at the first plane and a third area located at the first plane. The third area is located in the first area. The first area is quadrangular and has a first boundary, a second boundary, a third boundary and a fourth boundary which are connected in order. The square measure of the third area is smaller than or equal to that of the first area.

The reflective element is disposed at the first boundary and located on the first plane. A second plane of the reflective element substantially perpendicular to the first plane is a reflective mirror plane. The second plane mirrors the first area to form a second area. The second plane mirrors the third area to form a fourth area. The image sensor is disposed at a first corner at which the third boundary and the fourth boundary intersect and located on the first plane. The sensing range of the image sensor covers the third area and the fourth area. The processor is electrically connected to the image sensor.

The first light guide rod is disposed at the second boundary and located on the first plane. The first light guide rod has a first light-emitting surface and is mirrored by the reflective element to form a second mirror image. The second light guide rod is disposed at the third boundary and located on the first plane. The second light guide rod has a second light-emitting surface and is mirrored by the reflective element to form a third mirror image. At least part of the first light guide rod, at least part of the second mirror image and at least part of the third mirror image are located in the sensing range of the image sensor. The light source module is adapted to emit light entering the first light guide rod and the second light guide rod and being transmitted from the first light-emitting surface and the second light-emitting surface to the image sensor.

When the pointer approaches the third area and the pointer is mirrored by the reflective element to form a first mirror image such that the pointer and the first mirror image are located in the sensing range of the image sensor, the image sensor senses the pointer and the first mirror image and the processor calculates the location of the pointer.

In an embodiment of the present invention, the light source module has a first light source disposed at the first corner. The first light guide rod is connected to the second light guide rod. In addition, the light source module further has a second light source disposed at a second corner at which the first boundary and the second boundary intersect.

In an embodiment of the present invention, the light source module has a first light source disposed at a third corner at which the second boundary and the third boundary intersect. In addition, the light source module further has a second light source disposed at the first corner. Furthermore, the light source module further has a third light source disposed at a second corner at which the first boundary and the second boundary intersect.

In an embodiment of the present invention, the first light-emitting surface is a rough surface and the second light-emitting surface is a rough surface.

In an embodiment of the present invention, the sensing system further includes a first diffuser and a second diffuser. The first diffuser is disposed on the first light-emitting surface and the second diffuser is disposed on the second light-emitting surface.

In an embodiment of the present invention, the first light guide rod includes a first reflective layer disposed at a first bottom surface of the first light guide rod opposite to the first light-emitting surface. The second light guide rod includes a second reflective layer disposed at a second bottom surface of the second light guide rod opposite to the second light-emitting surface.

The present invention provides another sensing system adapted to sense a pointer and calculate a location of the pointer. The sensing system includes a panel, a reflective element, an image sensor, a processor, a first diffuser, a second diffuser and a light source module. The panel has a first plane, a first area located at the first plane and a third area located at the first plane. The third area is located in the first area. The first area is quadrangular and has a first boundary, a second boundary, a third boundary and a fourth boundary which are connected in order. The square measure of the third area is smaller than or equal to that of the first area.

The reflective element is disposed at the first boundary and located on the first plane. A second plane of the reflective element substantially perpendicular to the first plane is a reflective mirror plane. The second plane mirrors the first area to form a second area. The second plane mirrors the third area to form a fourth area. The image sensor is disposed at a first corner at which the third boundary and the fourth boundary intersect and located on the first plane. The sensing range of the image sensor covers the third area and the fourth area. The processor is electrically connected to the image sensor.

The first diffuser is disposed at the second boundary and located on the first plane. The first diffuser has a first light-emitting surface is mirrored by the reflective element to form a second mirror image. The second diffuser is disposed at the third boundary and located on the first plane. The second diffuser has a second light-emitting surface and is mirrored by the reflective element to form a third mirror image. At least part of the first diffuser, at least part of the second mirror image and at least part of the third mirror image are located in the sensing range of the image sensor. The light source module is adapted to emit light entering the first diffuser and the second diffuser and being transmitted from the first light-emitting surface and the second light-emitting surface to the image sensor.

When the pointer approaches the third area and the pointer is mirrored by the reflective element to form a first mirror image such that the pointer and the first mirror image are located in the sensing range of the image sensor, the image sensor senses the pointer and the first mirror image and the processor calculates the location of the pointer.

In an embodiment of the present invention, the light source module has a plurality of light sources. Part of the light sources are disposed at a first bottom surface of the first diffuser opposite to the first light-emitting surface. Another part of the light sources are disposed at a second bottom surface of the second diffuser opposite to the second light-emitting surface.

The processor of the sensing system of the embodiment of the present invention can calculate the location of the pointer by means of employing the reflective element and the image sensor. Therefore, compared with the conventional arts, the sensing system of the present embodiment can employ one image sensor such that the production cost thereof is low.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

DETAILED DESCRIPTION

Reference will now be made to the drawings to describe exemplary embodiments of the present sensing system, in detail. The following description is given by way of example, and not limitation.

First Embodiment

Figure 1:
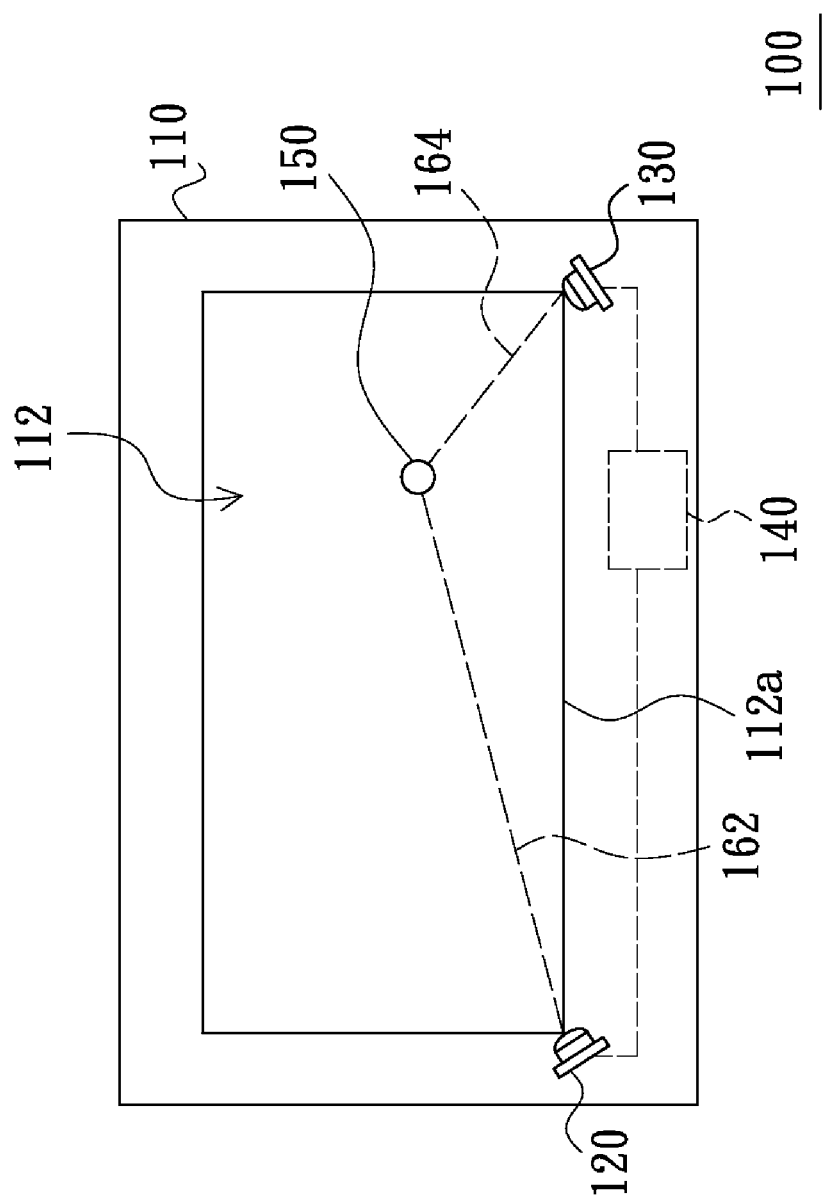
FIG. 1 is a schematic view of a conventional touch screen system.
Figure 2:
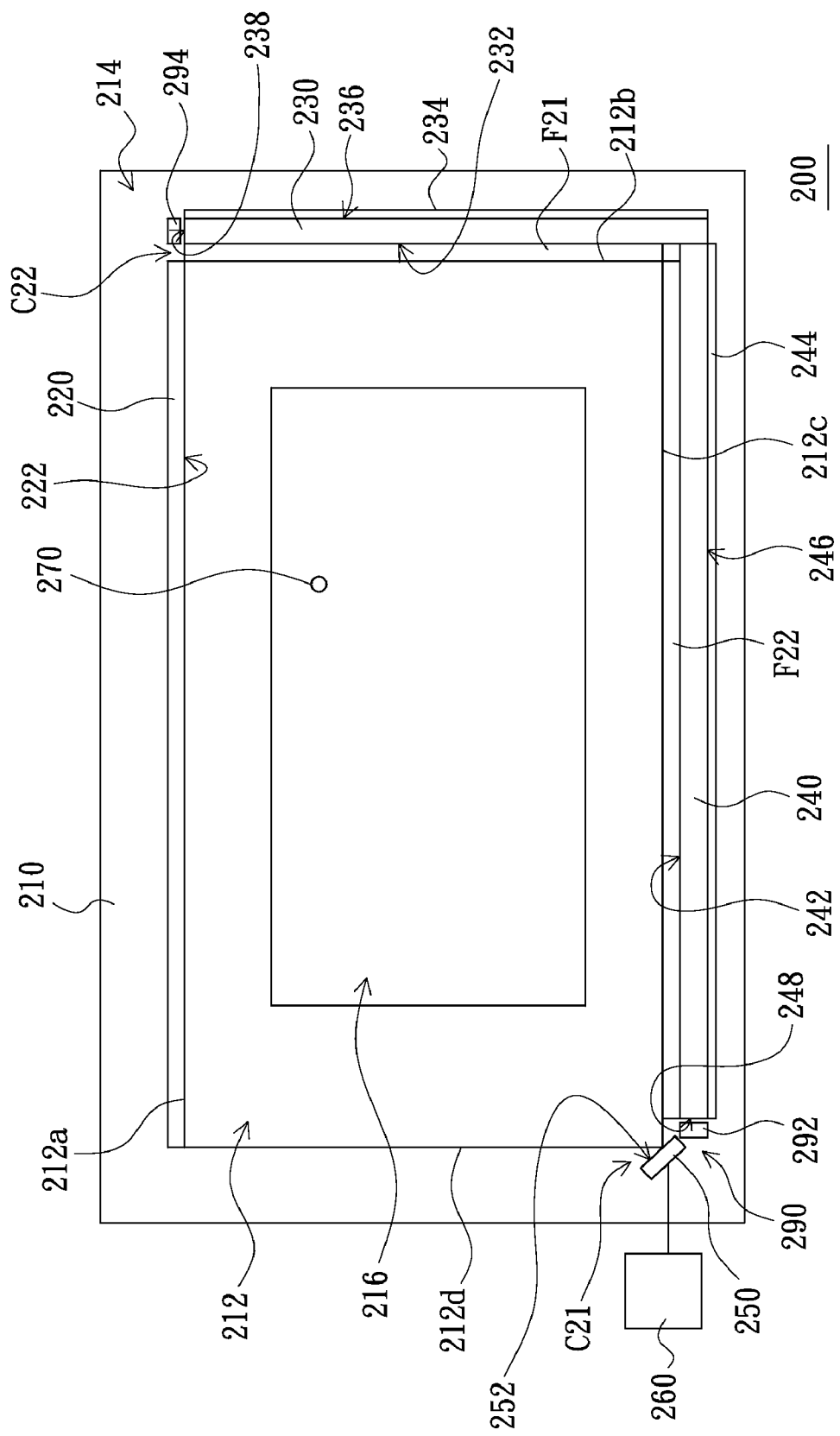
FIG. 2 is a schematic top view of the sensing system of a first embodiment of the present invention.
Figure 3:
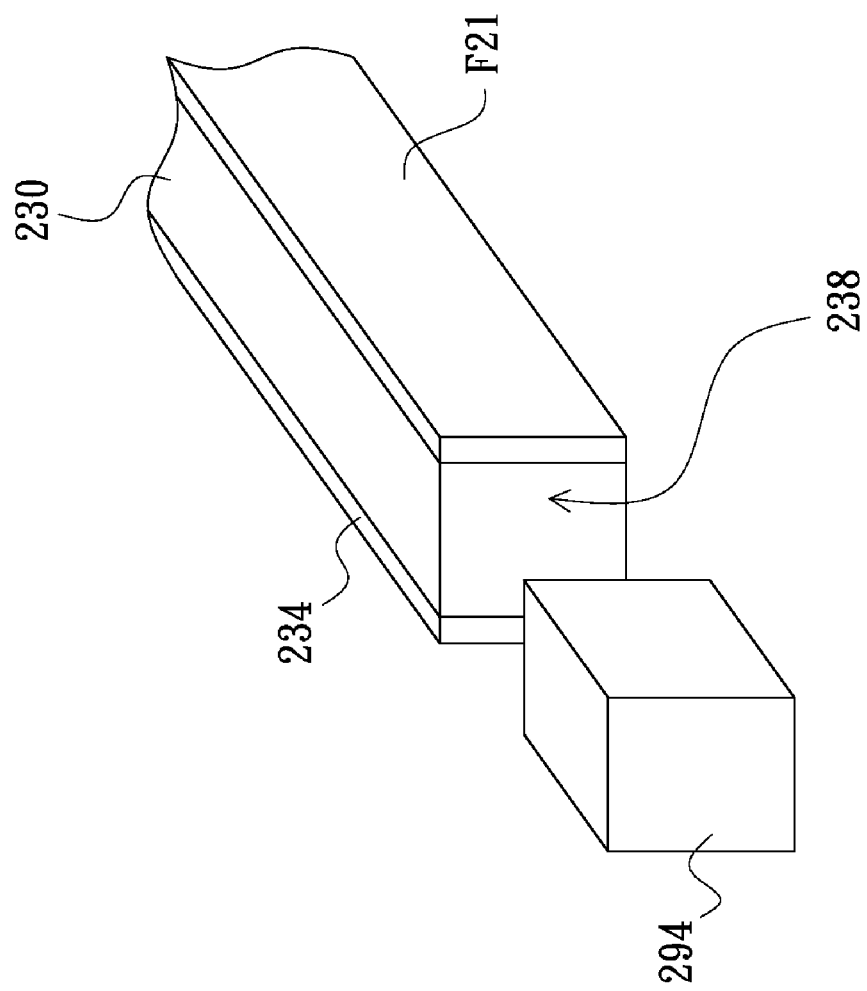
FIG. 3 is a schematic three-dimensional view showing the disposition of the second light source, the first light guide rod and the first diffuser of FIG. 2.
Figure 4:
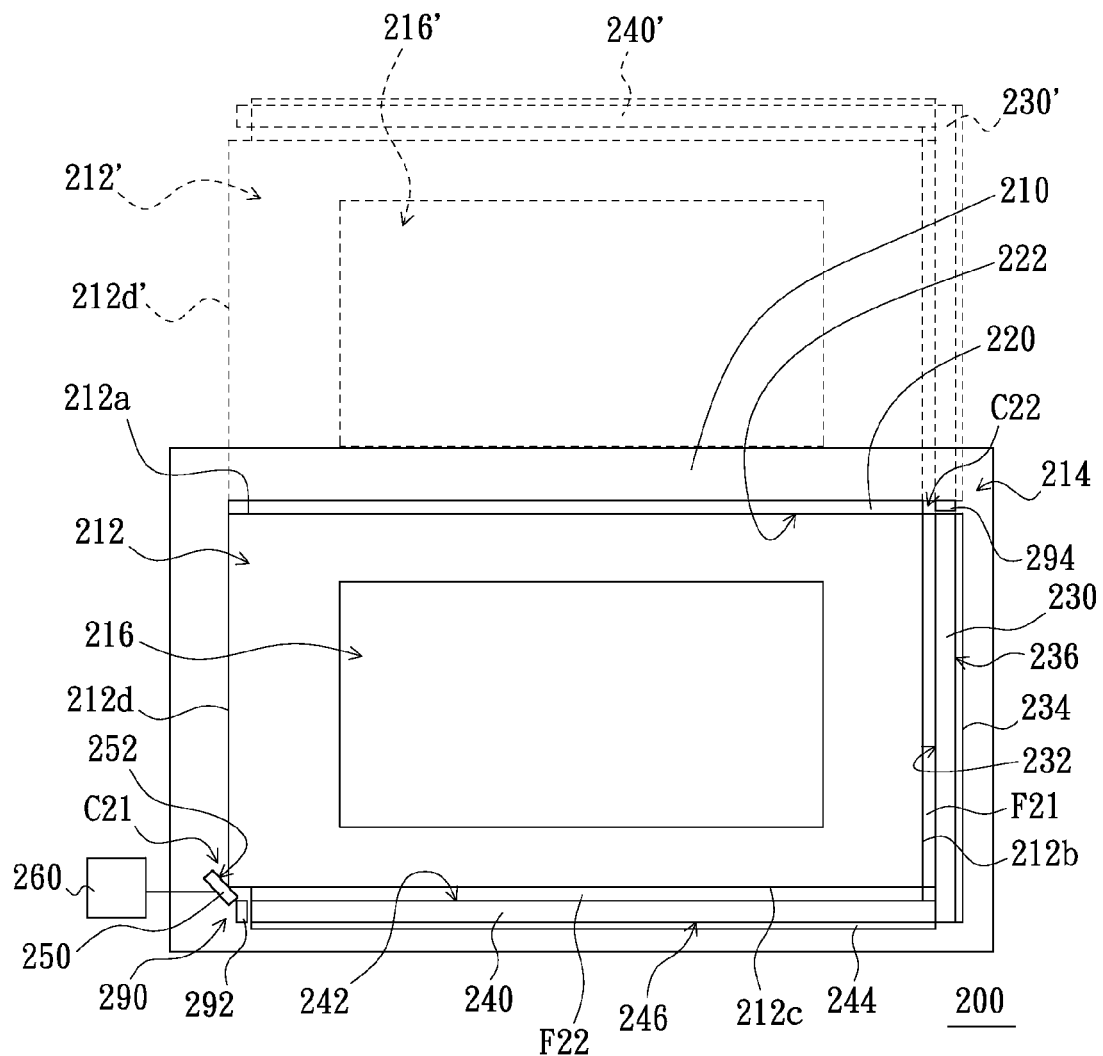
FIG. 4 is a schematic top view of the sensing system of FIG. 2 in operation.

FIG. 2 is a schematic top view of the sensing system of a first embodiment of the present invention. FIG. 3 is a schematic three-dimensional view showing the disposition of the second light source, the first light guide rod and the first diffuser of FIG. 2. FIG. 4 is a schematic top view of the sensing system of FIG. 2 in operation. Referring to FIGS. 2, 3 and 4, the sensing system 200 is adapted to sense a pointer 270 and calculates a location of the pointer 270 and the detailed description is given below. The sensing system 200 includes a panel 210, a reflective element 220, a first light guide rod 230, a second light guide rod 240, an image sensor 250, a processor 260 and a light source module 290. The panel 210, for example, a whiteboard or a touch screen, has a first plane 214, a first area 212 located at the first plane 214 and a third area 216 located at the first plane 214. The third area 216 is located in the first area 212. The first area 212 is quadrangular, such as a rectangle. The first area 212 has a first boundary 212$a$, a second boundary 212$b$, a third boundary 212$c$ and a fourth boundary 212$d$ which are connected in order. The third area 216 is quadrangular, such as a rectangle.

In the present embodiment, the square measure of the third area 216 may be smaller than that of the first area 212. It should be noted that the shape and the disposition of the third area 216 can be referred to Taiwan patent application no. 097142355 and the corresponding U.S. patent application Ser. No. 12/334,449 and not described in detail herein. In another embodiment, the square measure of the third area 216 may be equal to that of the first area 212 and the third area 216 coincides with the first area 212. However, the above description is not shown in any drawing.

The reflective element 220 is disposed at the first boundary 212$a$ and located on the first plane 214. A second plane 222 of the reflective element 220 is substantially perpendicular to the first plane 214 and the second plane 222 is a reflective mirror plane. The second plane 222 mirrors the first area 212 to form a second area 212' and the second plane 222 mirrors the third area 216 to form a fourth area 216'. The reflective element 220 is a plane mirror but not limited herein.

The first light guide rod 230 is disposed at the second boundary 212$b$ and located on the first plane 214. The first light guide rod 230 has a first light-emitting surface 232. The first light guide rod 230 is mirrored by the reflective element 220 to form a second mirror image 230'. The second light guide rod 240 is disposed at the third boundary 212$c$ and located on the first plane 214. The second light guide rod 240 has a second light-emitting surface 242. The second light guide rod 240 is mirrored by the reflective element 220 to form a third mirror image 240'. In the present embodiment, the first light guide rod 230 is directly connected to the second light guide rod 240. The sensing system 200 further includes a first diffuser F21 and a second diffuser F22. The first diffuser F21 is disposed on the first light-emitting surface 232 and the second diffuser F22 is disposed on the second light-emitting surface 242. In another embodiment, the first diffuser F21 and the second diffuser F22 can be omitted and the first light-emitting surface 232 and the second light-emitting surface 242 can be rough surfaces, respectively. However, the above description is not shown in any drawing.

In the present embodiment, the first light guide rod 230 includes a first reflective layer 234 disposed at a first bottom surface 236 of the first light guide rod 230 opposite to the first light-emitting surface 232. The second light guide rod 240 includes a second reflective layer 244 disposed at a second bottom surface 246 of the second light guide rod 240 opposite to the second light-emitting surface 242. In another embodiment, the first reflective layer 234 and the second reflective layer 244 can be omitted.

In addition, the fourth boundary 212d of the first area 212 is mirrored by the reflective element 220 to form a fourth mirror image 212d'. The reflective element 220, the first light guide rod 230, the second light guide rod 240 and the fourth boundary 212d surround the first area 212. The reflective element 220, the second mirror image 230', the third mirror image 240' and the fourth mirror image 212d' surround the second area 212'.

The image sensor 250 is disposed at a first corner C21 at which the third boundary 212c and the fourth boundary 212d intersect and located on the first plane 214. The sensing range of the image sensor 250 covers the third area 216 and the fourth area 216'. At least part of the first light guide rod 230, at least part of the second mirror image 230' and at least part of the third mirror image 240' are located in the sensing range of the image sensor 250. In the present embodiment, part of the first light guide rod 230, the second mirror image 230' and part of the third mirror image 240' are located in the sending range of the image sensor 250. In addition, the processor 260 is electrically connected to the image sensor 250.

The light source module 290 is adapted to emit light entering the first light guide rod 230 and the second light guide rod 240 and being transmitted from the first light-emitting surface 232 and the second light-emitting surface 242 to the image sensor 250. Specifically, the light source module 290 has a first light source 292 and a second light source 294. The first light source 292 is disposed at the first corner C21. The second light source 294 is disposed at a second corner C22 at which the first boundary 212a and the second boundary 212b intersect. The first light source 292 and the second light source 294 may be light-emitting-diode elements (LED elements), respectively. The first light guide rod 230 has a first side surface 238 adjacent to the first light-emitting surface 232 and the second light guide rod 240 has a second side surface 248 adjacent to the second light-emitting surface 242. The first light source 292 is located at the second side surface 248 and adapted to emit light to the second side surface 248. The second light source 294 is located at the first side surface 238 and adapted to emit light to the first side surface 238. In another embodiment, the second light source 294 can be omitted.

Figure 5:
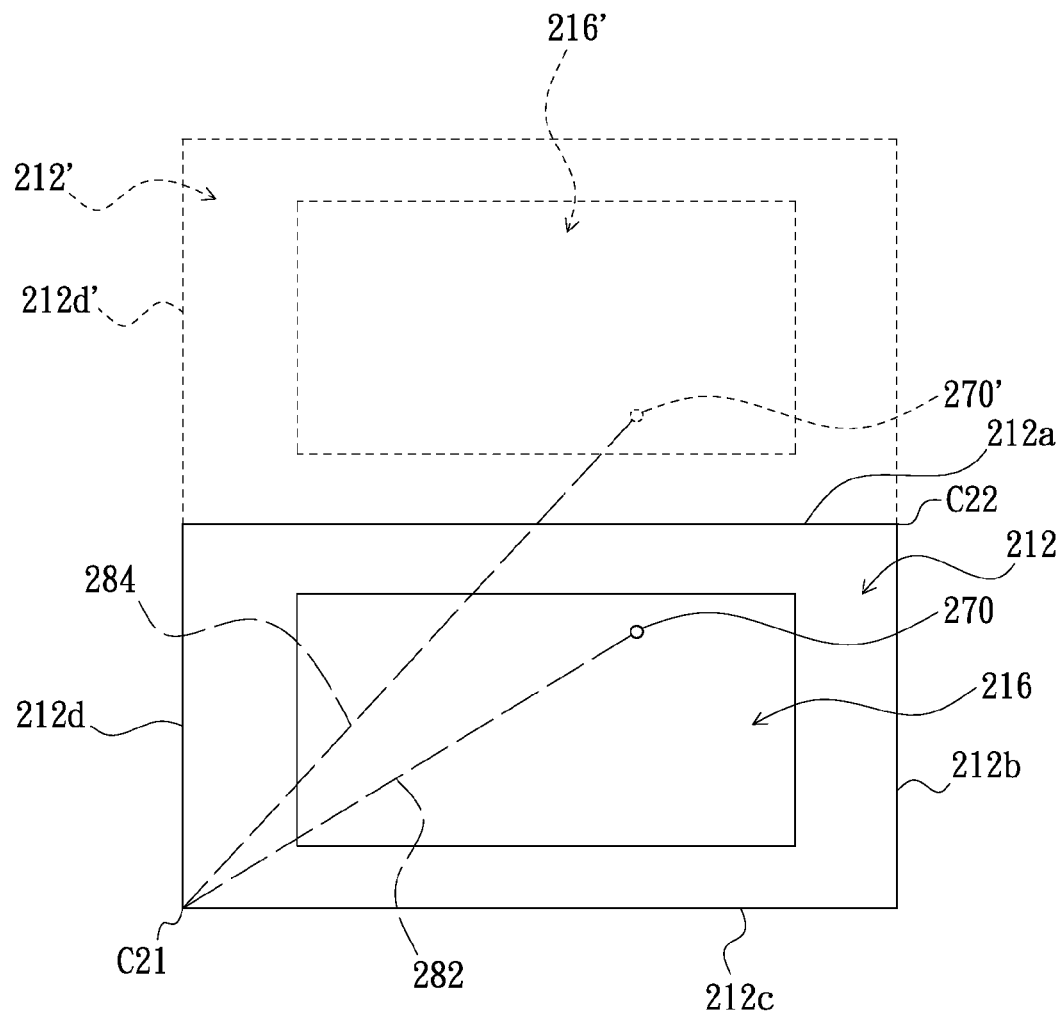
FIG. 5 is a schematic view showing that a processor of FIG. 3 calculates the location of the pointer.

FIG. 5 is a schematic view showing that a processor of FIG. 3 calculates the location of the pointer. Referring to FIGS. 4 and 5, when the pointer 270 approaches the third area 216 and the pointer 270 is mirrored by the reflective element 220 to form a first mirror image 270' such that the pointer 270 and the first mirror image 270' are located in the sensing range of the image sensor 250, the image sensor 250 senses the pointer 270 and the first mirror image 270' and the processor 260 calculates the location of the pointer 270. In specific, the image sensor 250 of the present embodiment sense the pointer 270 along a first sensing path 282 and sense the first mirror image 270' along a second sensing path 284. The processor 260 calculates the location of the pointer 270 according to the first sensing path 282 and the second sensing path 284.

In the present embodiment, the image sensor 250 has an image-sensing window 252. When the pointer 270 does not approach the third area 216, light emitted from the first light-emitting surface 232 of the first light guide rod 230, the part of the second mirror image 230' corresponding to the first light-emitting surface 232 and the part of the third mirror image 240' corresponding to the second light-emitting surface 242 illuminates the image-sensing window 252 to form a bright zone with high brightness on the image-sensing window 252. The bright zone is a primary sensing zone. When the pointer 270 approaches the third area 216, a first obscure strip corresponding to the pointer 270 and a second obscure strip corresponding to the first mirror image 270' are formed in the bright zone of the image-sensing window 252. Therefore, the processor 260 can calculate the location of the pointer 270 on the third area 216 according to the position of the first obscure strip and the second obscure strip on the image-sensing window 252. The above related technology can be referred to Taiwan patent applications no. 097126033, 097142355 and 098100969 and the corresponding U.S. patent application Ser. Nos. 12/249,222, 12/334,449 and 12/422,191. It is not described in detail herein.

The processor 260 of the sensing system 200 of the present embodiment can calculate the location of the pointer 270 by means of employing the reflective element 220 and the image sensor 250. Therefore, compared with the conventional arts, the sensing system 200 of the present embodiment can employ one image sensor 250 such that the production cost of the sensing system 200 is low.

Second Embodiment

Figure 6:
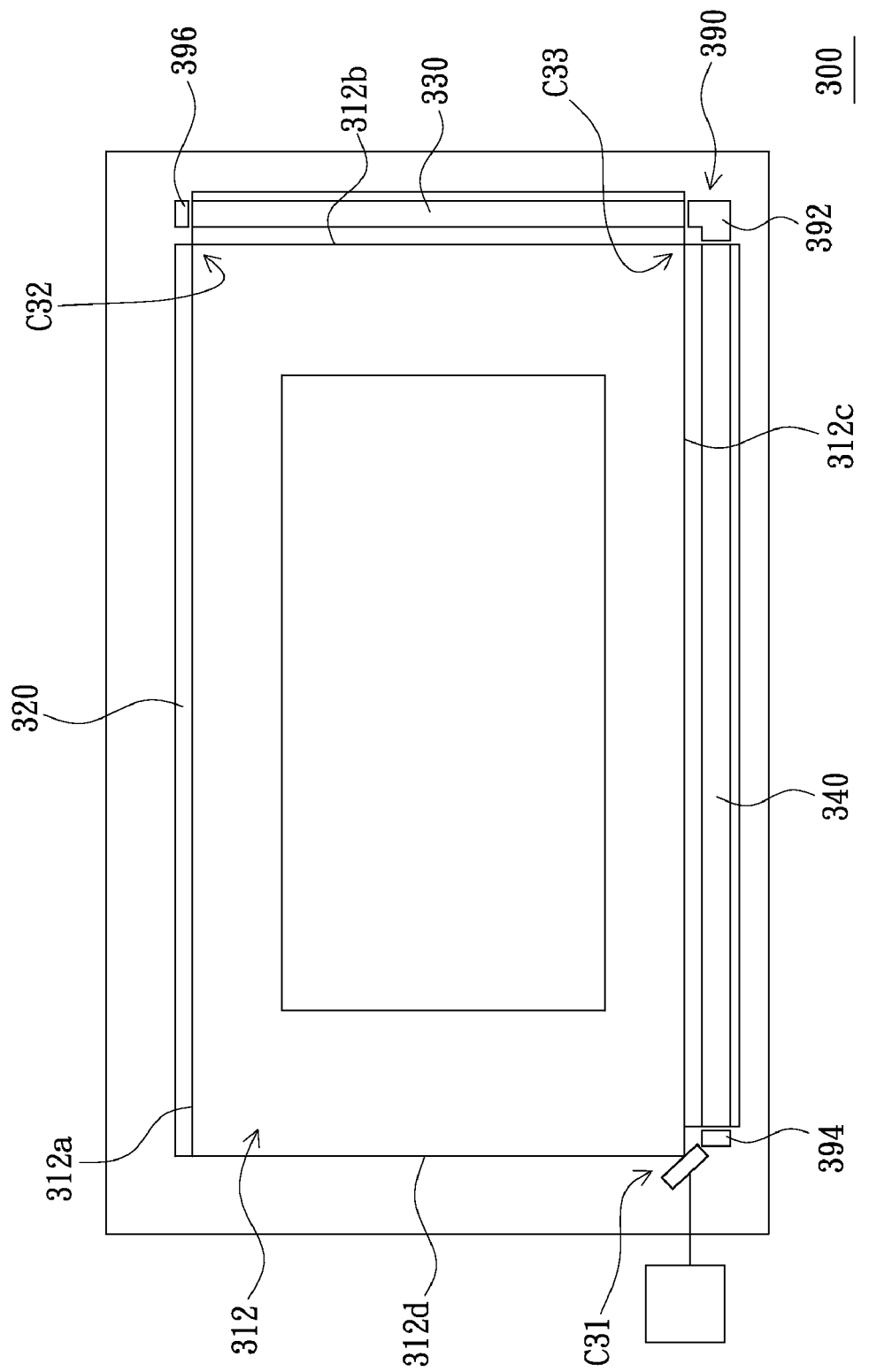
FIG. 6 is a schematic top view of a sensing system of a second embodiment of the present invention.

FIG. 6 is a schematic top view of a sensing system of a second embodiment of the present invention. Referring to FIGS. 2 and 6, the difference between the sensing system 300 of the present embodiment and the sensing system 200 of the first embodiment lies in that the light source module 390 of the sensing system 300 of the present embodiment has the first light source 392, the second light source 394 and the third light source 396 and the first light guide rod 330 does not contact with the second light guide rod 340.

The reflective element 320 is disposed at the first boundary 312a of the first area 312. The first light source 392 is disposed at a third corner C33 at which the second boundary 312b and the third boundary 312c of the first area 312 intersect. The second light source 394 is disposed at the first corner C31 at which the third boundary 312c and the fourth boundary 312d of the first area 312 intersect. The third light source 396 is disposed at a second corner C32 at which the first boundary 312a and the second boundary 312b of the first area 312 intersect. In another embodiment, the third light source 396 can be omitted. In another embodiment, the second light source 394 and the third light source 396 can be omitted.

Third Embodiment

Figure 7:
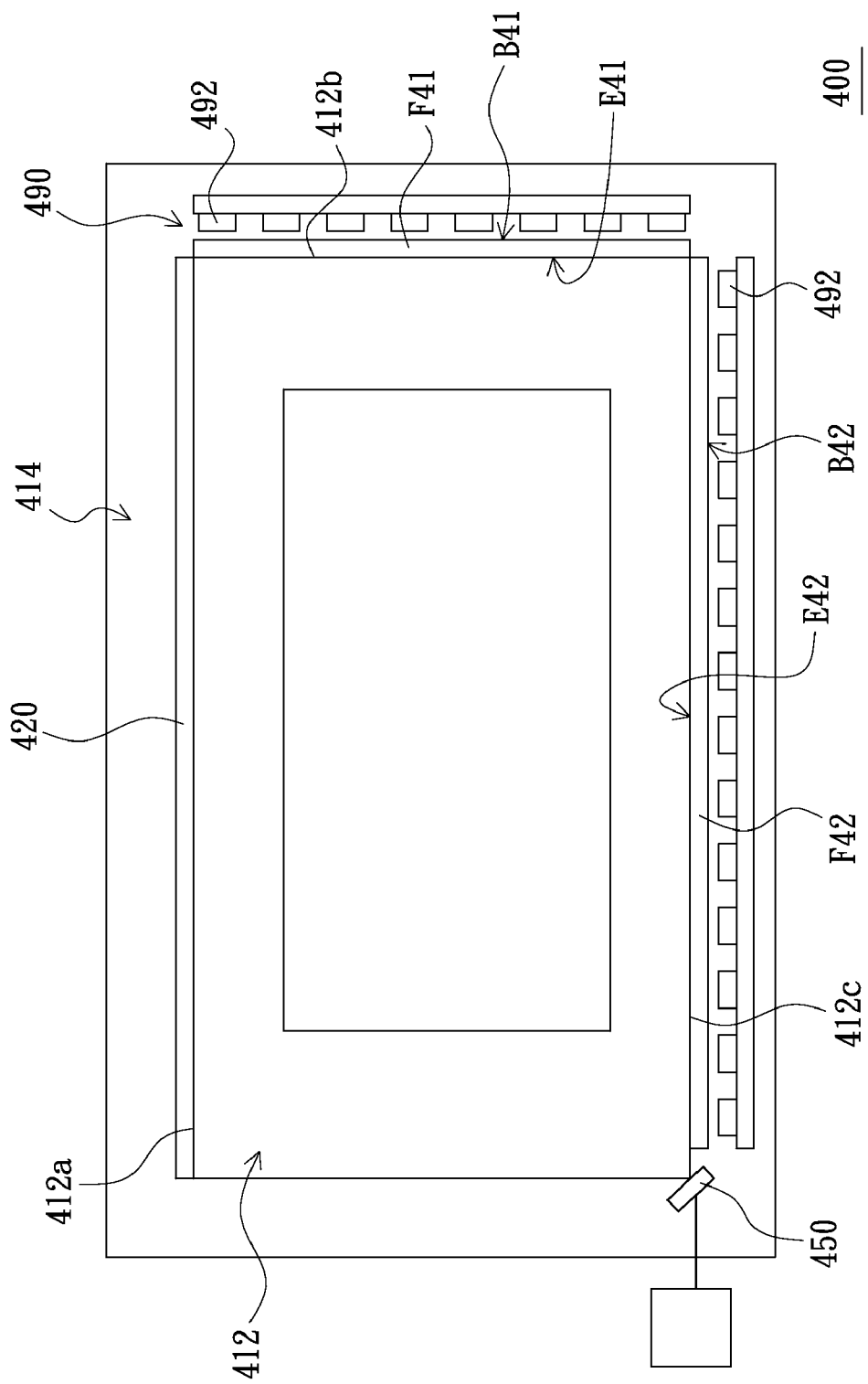
FIG. 7 is a schematic top view of a sensing system of a third embodiment of the present invention.

FIG. 7 is a schematic top view of a sensing system of a third embodiment of the present invention. Referring to FIGS. 2 and 7, the difference of the sensing system 400 of the present embodiment and the sensing system 200 of the first embodiment lies in that the first light guide rod 230 and the second light guide rod 240 can be omitted in the sensing system 400 of the present embodiment and the light source module 490 has a plurality of light sources 492.

The reflective element 420 is disposed at the first boundary 412a of the first area 412. The first diffuser F41 is disposed at the second boundary 412b of the first area 412 and located on the first plane 414. The second diffuser F42 is disposed at the third boundary 412c of the first area 412 and located on the first plane 414. The first diffuser F41 has a first light-emitting surface E41 and a first bottom surface B41. The first light-emitting surface E41 and the first bottom surface B41 are opposite to each other. The second diffuser F42 has a second light-emitting surface E42 and a second bottom surface B42. The second light-emitting surface E42 and the second bottom surface B42 are opposite to each other. Part of the light sources 492 are disposed at the first bottom surface B41 and another part of the light sources 492 are disposed at the second bottom surface B42. To sum up, the light source module 490 is adapted to emit light entering the first diffuser F41 and the second diffuser F42 through the first bottom surface B41 and the second bottom surface B42 and being transmitted from the first light-emitting surface E41 and the second light-emitting surface E42 to the image sensor 450.

Based on the above description, the sensing system of the embodiment of the present invention at least has the following advantages or other advantages. The processor of the sensing system of the embodiment of the present invention can calculate the location of the pointer by means of employing the reflective element and the image sensor. Therefore, compared with the conventional arts, the present sensing system can employ one image sensor such that the production cost of the sensing system of the embodiment of the present invention is low.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A sensing system adapted to sense a pointer and calculate a location of the pointer, comprising:
    a panel having a first plane, a first area located at the first plane and a third area located at the first plane, wherein the third area is located within the first area, the first area is quadrangular and has a first boundary, a second boundary, a third boundary and a fourth boundary which are connected in order, and the third area is smaller than or equal to the first area;
    a reflective element disposed at the first boundary and located on the first plane, wherein a second plane of the reflective element is substantially perpendicular to the first plane, the second plane is a reflective mirror plane, the second plane mirrors the first area to form a second area, and the second plane mirrors the third area to form a fourth area;
    an image sensor disposed at a first corner at which the third boundary and the fourth boundary intersect and located on the first plane, wherein the sensing range of the image sensor covers the third area and the fourth area;
    a processor electrically connected to the image sensor;
    a first light guide rod disposed at the second boundary and located on the first plane, wherein the first light guide rod has a first light-emitting surface and is mirrored by the reflective element to form a second mirror image;
    a second light guide rod disposed at the third boundary and located on the first plane, wherein the second light guide rod has a second light-emitting surface and is mirrored by the reflective element to form a third mirror image, and at least part of the first light guide rod, at least part of the second mirror image and at least part of the third mirror image are located in the sensing range of the image sensor; and
    a light source module adapted to emit light entering the first light guide rod and the second light guide rod and being transmitted from the first light-emitting surface and the second light-emitting surface to the image sensor;
    when the pointer approaches the third area and the pointer is mirrored by the reflective element to form a first mirror image such that the pointer and the first mirror image are located in the sensing range of the image sensor, the image sensor senses the pointer and the first mirror image and the processor calculates the location of the pointer.

2. The sensing system as claimed in claim 1, wherein the light source module has a first light source disposed at the first corner.

3. The sensing system as claimed in claim 2, wherein the light source module further has a second light source disposed at a second corner at which the first boundary and the second boundary intersect.

4. The sensing system as claimed in claim 1, wherein the light source module has a first light source disposed at a third corner at which the second boundary and the third boundary intersect.

5. The sensing system as claimed in claim 4, wherein the light source module further has a second light source disposed at the first corner.

6. The sensing system as claimed in claim 5, wherein the light source module further has a third light source disposed at a second corner at which the first boundary and the second boundary intersect.

7. The sensing system as claimed in claim 1, wherein the first light-emitting surface is a rough surface and the second light-emitting surface is a rough surface.

8. The sensing system as claimed in claim 1, further comprising a first diffuser and a second diffuser, wherein the first diffuser is disposed on the first light-emitting surface and the second diffuser is disposed on the second light-emitting surface.

9. The sensing system as claimed in claim 1, wherein the first light guide rod comprises a first reflective layer disposed at a first bottom surface of the first light guide rod opposite to the first light-emitting surface, and the second light guide rod comprises a second reflective layer disposed at a second bottom surface of the second light guide rod opposite to the second light-emitting surface.

10. A sensing system adapted to sense a pointer and calculate a location of the pointer, comprising:
    a panel having a first plane, a first area located at the first plane and a third area located at the first plane, wherein the third area is located within the first area, the first area is quadrangular and has a first boundary, a second boundary, a third boundary and a fourth boundary which are connected in order, and the third area is smaller than or equal to the first area;
    a reflective element disposed at the first boundary and located on the first plane, wherein a second plane of the reflective element is substantially perpendicular to the first plane, the second plane is a reflective mirror plane, the second plane mirrors the first area to form a second area, and the second plane mirrors the third area to form a fourth area;

an image sensor disposed at a first corner at which the third boundary and the fourth boundary intersect and located on the first plane, wherein the sensing range of the image sensor covers the third area and the fourth area;

a processor electrically connected to the image sensor;

a first diffuser disposed at the second boundary and located on the first plane, wherein the first diffuser has a first light-emitting surface and is mirrored by the reflective element to form a second mirror image;

a second diffuser disposed at the third boundary and located on the first plane, wherein the second diffuser has a second light-emitting surface and is mirrored by the reflective element to form a third mirror image, and at least part of the first diffuser, at least part of the second mirror image and at least part of the third mirror image are located in the sensing range of the image sensor; and a light source module adapted to emit light entering the first diffuser and the second diffuser and being transmitted from the first light-emitting surface and the second light-emitting surface to the image sensor;

when the pointer approaches the third area and the pointer is mirrored by the reflective element to form a first mirror image such that the pointer and the first mirror image are located in the sensing range of the image sensor, the image sensor senses the pointer and the first mirror image and the processor calculates the location of the pointer.

11. The sensing system as claimed in claim 10, wherein the light source module has a plurality of light sources, part of the light sources are disposed at a first bottom surface of the first diffuser opposite to the first light-emitting surface, and another part of the light sources are disposed at a second bottom surface of the second diffuser opposite to the second light-emitting surface.

* * * * *